United States Patent
Lee

(10) Patent No.: US 7,054,382 B2
(45) Date of Patent: May 30, 2006

(54) MODULATOR OF PHASE SHIFT KEYING (PSK) TYPE

(75) Inventor: Dae-Hun Lee, Ichon-shi (KR)

(73) Assignee: Magnachip Semiconductor, Ltd., Cheongju (KR)

(*) Notice: Subject to any disclaimer, the term of this patent is extended or adjusted under 35 U.S.C. 154(b) by 742 days.

(21) Appl. No.: 10/096,871

(22) Filed: Mar. 14, 2002

(65) Prior Publication Data
US 2003/0112894 A1 Jun. 19, 2003

(30) Foreign Application Priority Data
Dec. 13, 2001 (KR) ............................. 2001-78808

(51) Int. Cl.
H04L 27/20 (2006.01)
(52) U.S. Cl. .................. 375/295; 375/308; 332/103
(58) Field of Classification Search ................ 375/130, 375/308, 279, 280, 282, 329, 333; 332/103; 455/102, 110, 112, 113
See application file for complete search history.

(56) References Cited

U.S. PATENT DOCUMENTS

| | | | |
|---|---|---|---|
| 5,534,828 A * | 7/1996 | Okada et al. ................ 332/103 |
| 5,825,829 A | 10/1998 | Borazjani et al. | |
| 6,046,630 A * | 4/2000 | Kim ............................. 329/304 |
| 6,137,833 A * | 10/2000 | Lange et al. ................. 375/234 |
| 6,266,321 B1 * | 7/2001 | Pehkonen et al. ........... 370/206 |
| 6,301,310 B1 * | 10/2001 | Jackson et al. .............. 375/309 |
| 6,310,870 B1 * | 10/2001 | Li ................................ 370/342 |
| 6,366,604 B1 * | 4/2002 | Mohindra .................... 375/146 |
| 6,396,804 B1 * | 5/2002 | Odenwalder ................ 370/209 |
| 6,574,286 B1 * | 6/2003 | McVey ........................ 375/308 |
| 6,678,311 B1 * | 1/2004 | Odenwalder ................ 375/147 |
| 6,697,415 B1 * | 2/2004 | Mahany ....................... 375/130 |
| 2005/0218332 A1 * | 10/2005 | Rutten et al. ........... 250/370.09 |

FOREIGN PATENT DOCUMENTS

KR 95-3669 4/1995

OTHER PUBLICATIONS

Bernard Sklar, Digital communication, Sep. 2004, Prentice Hall Book,, 2nd edition, Tenth printing, ISBN 0-13-084788-7, pp.: 363-364 (Section : 6.7.5).*

* cited by examiner

Primary Examiner—Tesfaldet Bocure
Assistant Examiner—Nasrin Hoque
(74) Attorney, Agent, or Firm—Mayer, Brown, Rowe & Maw LLP

(57) ABSTRACT

A modulator phase shift keying modulator for performing data modulation by using the phase difference of each I/Q channel, comprising a data shifter for controlling delay of I/Q channel digital data at input terminals of the I/Q channels.

7 Claims, 9 Drawing Sheets

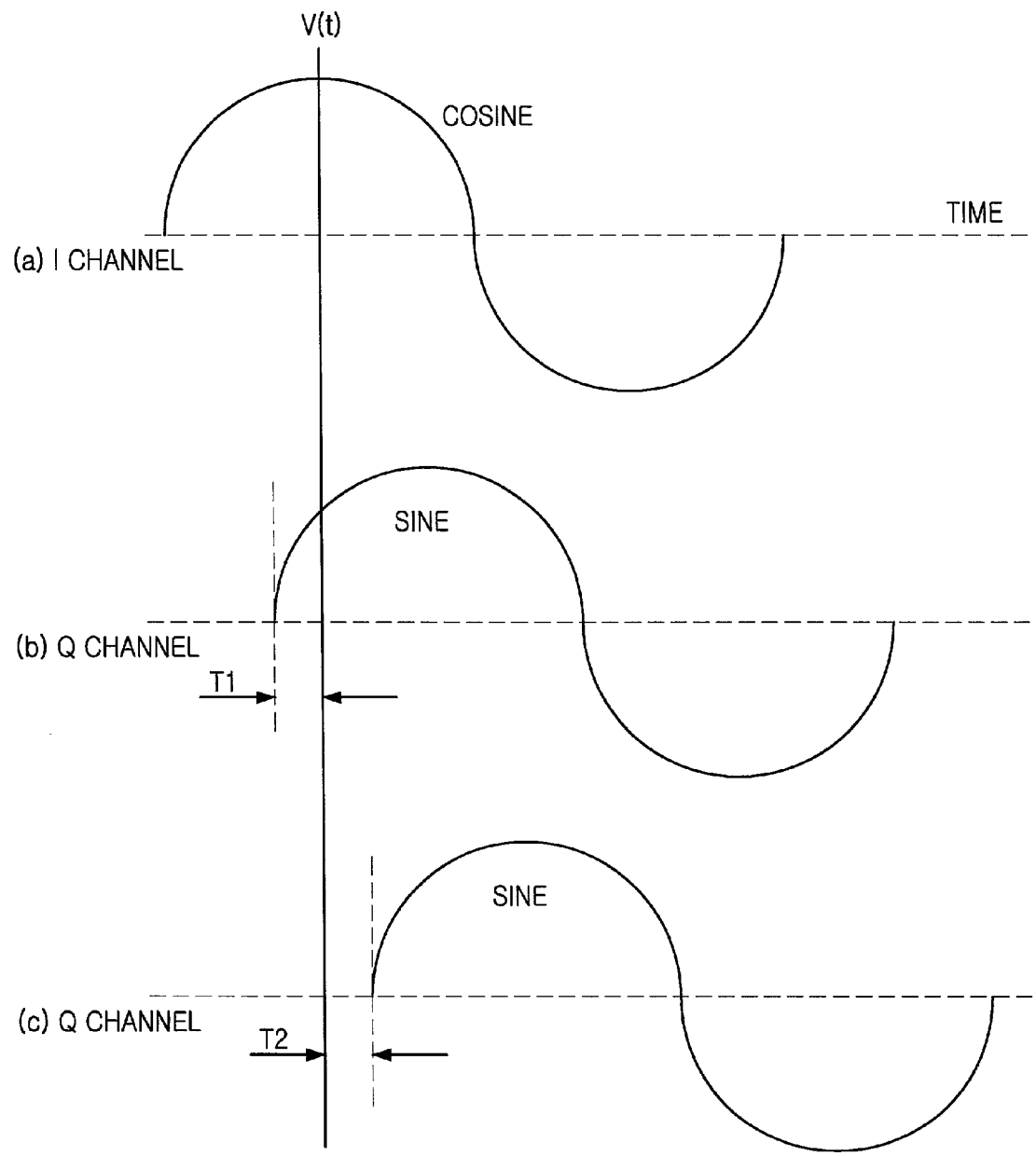

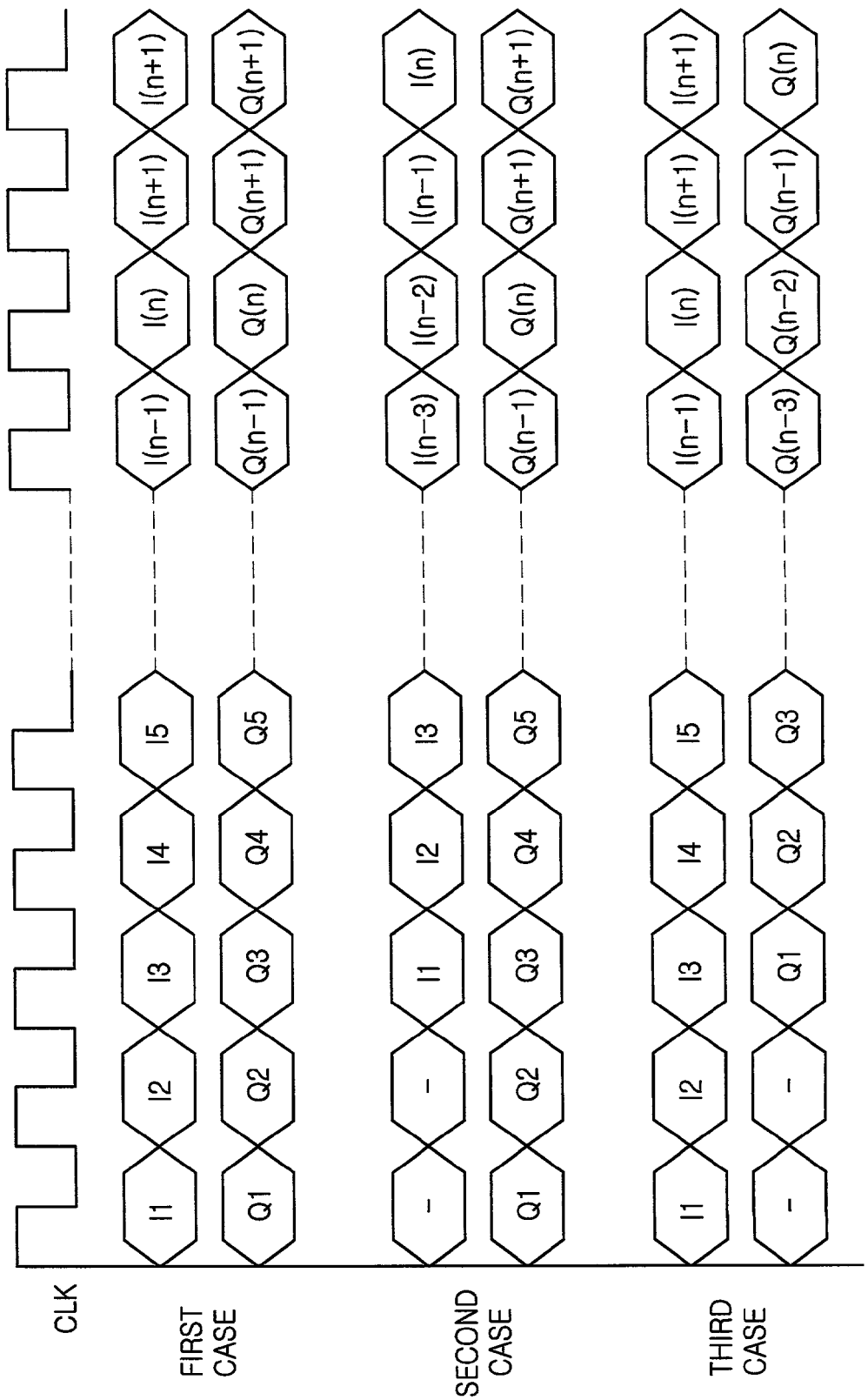

US 7,054,382 B2

MODULATOR OF PHASE SHIFT KEYING (PSK) TYPE

FIELD OF THE INVENTION

The present invention relates to a digital communication system and, more particularly, to a modulator using phase shift keying (PSK) modulation.

DESCRIPTION OF RELATED ART

Modulation types currently used in digital communication systems include amplitude modulation, frequency modulation and phase modulation. The phase modulation type, that is, a phase shift keying type, is the signal modulation technology currently adopted in most mobile communication systems.

FIG. 1 is a block diagram showing an I/Q modulator of the PSK type according to the prior art.

Referring to FIG. 1, the I/Q modulator of the PSK type according to the prior art includes two paths of the I and Q channels, which are symmetrically configured. Firstly, the I channel includes a first digital-to-analog converter (DAC) 11 and a first low pass filter (LPF) 13. The first DAC 11 converts N bits of I channel digital data into analog signals in response to a first clock signal CLK1 and the first LPF 13 filters output signals A of the first DAC 11. The Q channel includes a second digital-to-analog converter (DAC) 12 and a second low pass filter (LPF) 14. The DAC 12 converts N bits of Q channel digital data into analog signals in response to a second clock signal CLK2 and the second LPF 14 filters output signals B of the second DAC 12.

The I/Q modulator of the PSK type further includes a mixer 10 for outputting the I and Q channel data carried by carriers into a modulated channel. The mixer 10 includes an oscillator 19, a π/2 phase shifter 15, a first multiplier 16, a second multiplier 17 and an adder 18. The oscillator 19 generates a sine function carrier ($\sin(\omega_c t)$) having a predetermined frequency and the π/2 phase shifter 15 generates a cosine function carrier ($\cos(\omega_c t)$) by shifting the sine function carrier ($\sin(\omega_c t)$) outputted from the oscillator 19 as much as π/2 phase. The first multiplier 16 mixes the I channel data C outputted from the first LPF 13 with the cosine function carrier ($\cos(\omega_c t)$) and the second multiplier 17 mixes the Q channel data D outputted from the second LPF 14 with the sine function carrier ($\sin(\omega_c t)$). The adder 18 generates a desired signal by summing output signals E and F of the two multipliers 16 and 17.

In the I/Q modulator of the PSK type according to the prior art, when the data having a cosine value are inputted into the I channel, the data having a sine value are inputted into the Q channel and vice versa. When digital data having a specific frequency are inputted into the DACs 11 and 12, digitized sine waves are outputted. The digitized sine waves are mixed with the carriers outputted from the mixer 10 after passing through the LPFs 13 and 14 and then transmitted into channels.

FIG. 2 is a graph showing an operation of the mixer 10 in FIG. 1.

Referring to FIG. 2, if the I channel data having a cosine value and the cosine function carrier ($\cos(\omega_c t)$) are multiplied, a waveform is expressed such as '(a)' at a lower sideband (LSB) and an upper sideband (USB) and if the Q channel data having a sine value and the sine function carrier ($\sin(\omega_c t)$) are multiplied, a waveform is expressed such as (b). Accordingly, if the waveforms of (a) and (b) are summed, wave cancellation is caused at the lower sideband and a wave having twice the amplitude is implemented at the upper sideband. The transmitter modulates and transmits signals as described in the above and the receiver demodulates signals through integral.

Two things are required to completely perform the I/Q modulation in the viewpoint of the phase. The first thing is that a phase difference of the output signals C and D of the LPFs 13 and 14 has to be accurately π/2. Namely, since the data of the I channel is generally faster than the data of the Q channel by as much as the π/2 phase, the data of the I channel has a cosine value and the data of the Q channel has a sine value. The second thing is that a phase difference of the cosine function carrier ($\cos(\omega_c t)$) and the sine function carrier ($\sin(\omega_c t)$) has to be accurately π/2.

However, it is difficult to accurately implement a desired phase difference because of a difference in delay time of internal devices and mismatches generated from real chips. When the desired phase difference is not accurately implemented, it is difficult to restore original signals at the receiver because the I/Q modulation is not accurately performed.

FIG. 3A is a graph showing signal waveforms of the ideal I/Q channel. FIG. 3B is a graph showing signal waveforms of the real I/Q channel in which phase errors are generated.

Referring to FIG. 3A, the phase difference of the cosine value of the I channel and the sine value of the Q channel is accurately π/2 which is an ideal case. However, phase errors are generated in the real I/Q channel, as shown in FIG. 3B. When comparing the Q channel waveform of (b) in FIG. 3B with the I channel waveform of (a) in FIG. 3B, the sine value of the Q channel is earlier than the cosine value of the I channel by as much as T1. Also, when comparing the Q channel waveform of (c) in FIG. 3B with the I channel waveform of (a) in FIG. 3B, the sine value of the Q channel is later than the cosine value of the I channel by as much as T2.

SUMMARY OF THE INVENTION

It is, therefore, an object of the present invention to provide a modulator of a phase shift keying (PSK) type capable of compensating for phase mismatch between I/Q channels generated in an inside of a chip.

In accordance with an aspect of the present invention, there is provided a phase shift keying modulator for performing data modulation by using a phase difference between I/Q channels, comprising a data shifter for controlling delay of I/Q channel digital data at input terminals of the I/Q channels.

In accordance with another aspect of the present invention, there is provided a modulator of a phase shift keying type for performing data modulation by using a phase difference between channels, comprising a first data shifting means for controlling delay of I channel digital data; a second data shifting means for controlling delay of Q channel digital data; first and second digital-to-analog converting means for converting outputs of the first and second data shifting means into analog signals, respectively; first and second filtering means for filtering outputs of the first and second digital-to-analog converting means, respectively; a mixing means for carrying outputs of the first and second filtering means with first and second carrier signals having a predetermined phase difference and generating one signal; and a delay control means for detecting phase mismatch between outputs of the first and second filtering means and phase mismatch between the first and second carrier signals and controlling delay of the first and second data shifting means by as much as the detected phase mismatch.

BRIEF DESCRIPTION OF THE DRAWINGS

The above and other objects and features of the instant invention will become apparent from the following description of preferred embodiments taken in conjunction with the accompanying drawings, in which:

FIG. 3B is a graph showing signals in a real case of I/Q channels according to the prior art;

FIG. 7A is a timing diagram illustrating a phase mismatch compensation operation according to the present invention.

DETAILED DESCRIPTION OF THE INVENTION

Hereinafter, a signal modulation technology of the phase shift keying (PSK) type, which can compensate for phase mismatch of the I/Q channel according to the present invention, will be described in detail referring to the accompanying drawings.

Figure 1:
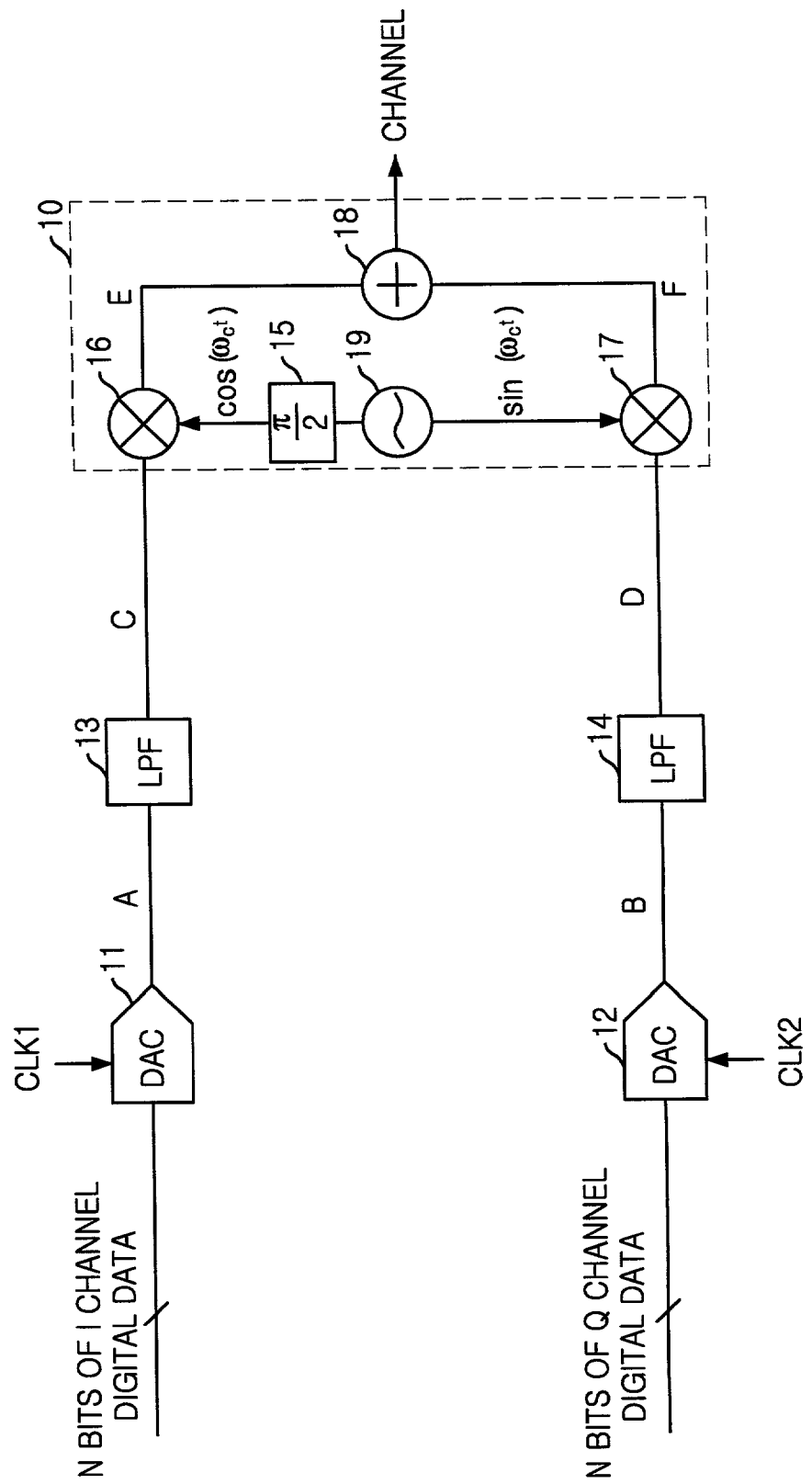
FIG. 1 is a block diagram showing an I/Q modulator of the PSK type according to the prior art.
Figure 2:
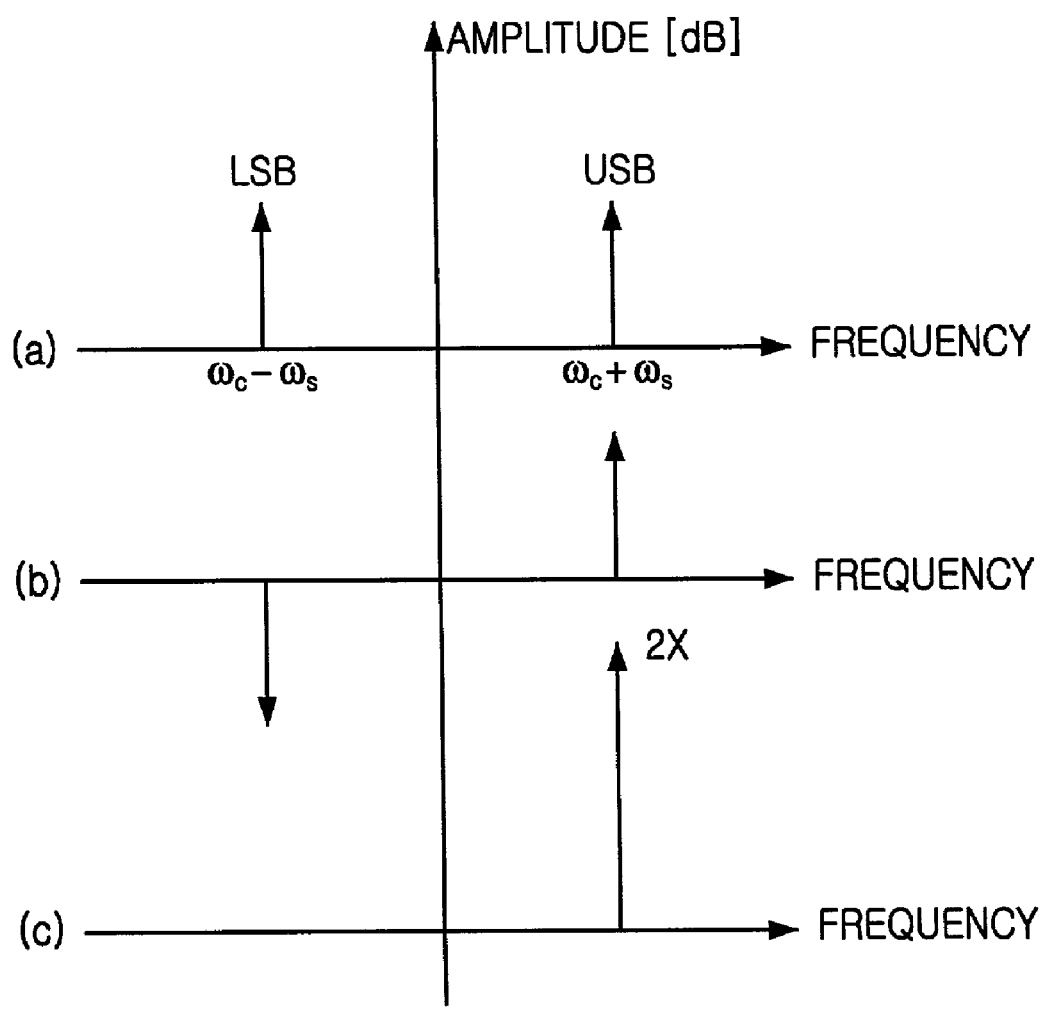
FIG. 2 is a graph showing an operation of the mixer 10 in FIG. 1.
Figure 3A:
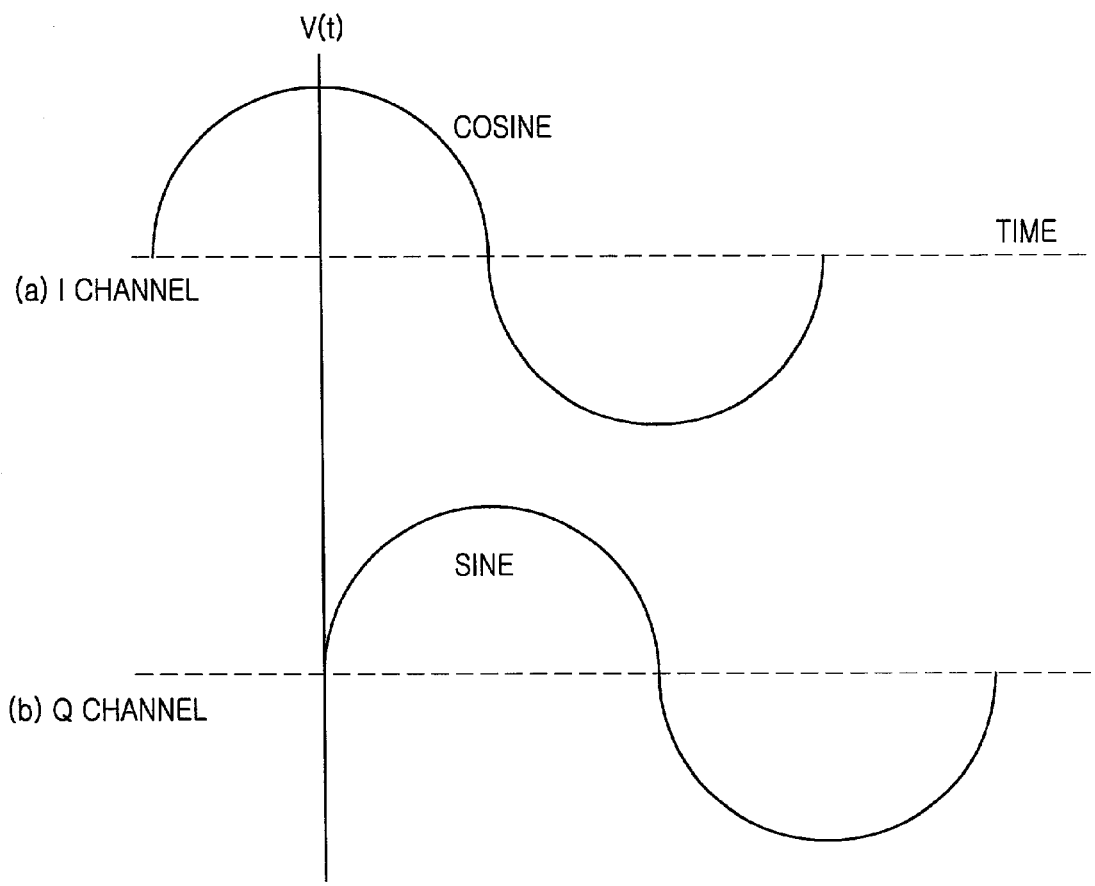
FIG. 3A is a graph showing signals in an ideal case of I/Q channels according to the prior art.
Figure 4:
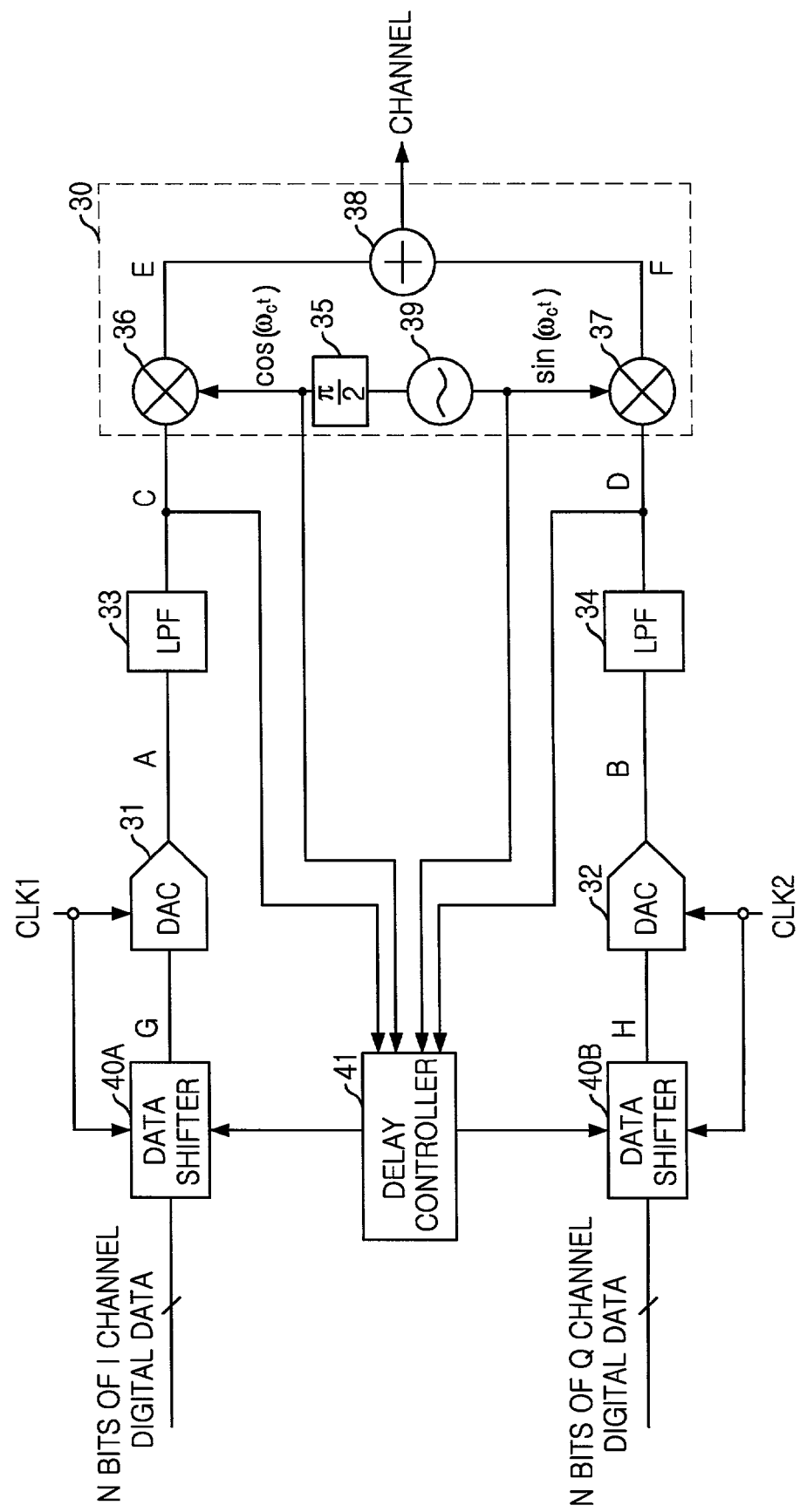
FIG. 4 is a block diagram showing an I/Q modulator of a PSK type according to the present invention.

FIG. 4 is a block diagram showing an I/Q modulator of the PSK type according to the present invention.

Referring to FIG. 4, an I channel and a Q channel of the I/Q modulator of the PSK type according to the present invention are symmetrically configured similar to the prior art. There are a first digital-to-analog (DAC) 31 and a first low pass filter (LPF) 33 in the I channel and there are a second digital-to-analog (DAC) 32 and a second low pass filter (LPF) 34 in the Q channel.

The I/Q modulator of the PSK type according to the present invention includes a mixer 30 for transmitting the I and Q channel data into channels by each carrier thereof.

The mixer 30 includes an oscillator 39, a $\pi/2$ phase shifter 35, a first multiplier 36, a second multiplier 37 and an adder 38. The oscillator 39 generates a sine function carrier $(\sin(\omega_c t))$ having a predetermined frequency and the $\pi/2$ phase shifter 35 generates a cosine function carrier (cos $(\omega_c t)$) by $\pi/2$ phase shifting the sine function carrier (sin $(\omega_c t)$) outputted from the oscillator 39. The first multiplier 36 mixes the I channel data C outputted from the first LPF 33 with the cosine function carrier $(\cos(\omega_c t))$ and the second multiplier 37 mixes the Q channel data D outputted from the second LPF 34 with the sine function carrier $(\sin(\omega_c t))$. The adder 38 generates a desired signal by summing output signals E and F of the two multipliers 36 and 37. The above configuration according to the present invention is similar to that of the prior art.

Unlike the prior art, the present invention includes a first data shifter 40A operated in response to the first clock signal CLK1 and connected to an input terminal of the first DAC 31 of the I channel, a second data shifter 40B operated in response to the second clock signal CLK2 and connected to an input terminal of the second DAC 32 of the Q channel and a delay controller 41 for controlling delay of the first and second data shifters 40A and 40B.

Figure 5:
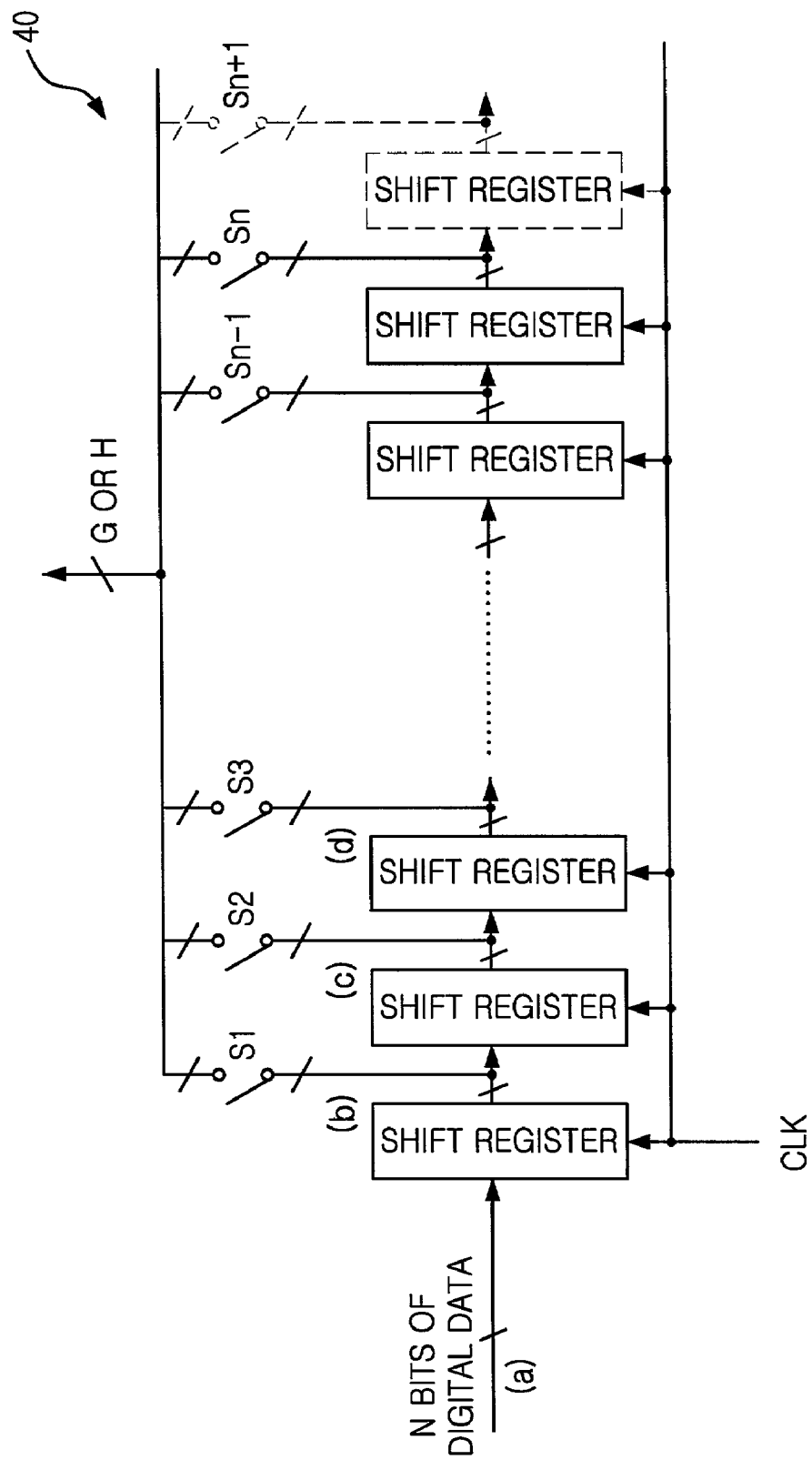
FIG. 5 is a schematic circuit diagram showing the data shifter of FIG. 4.

FIG. 5 is a schematic circuit diagram showing the first and second data shifter 40A and 40B, referred to generally by reference numeral 40.

Referring to FIG. 5, the data shifter 40 includes a plurality of shift registers, operated in response to the clock CLK and connected in series, and a plurality of switches S1 to Sn+1, which are connected to the output terminals of each shift register, for selectively outputting one of the shift register outputs.

Figure 6:
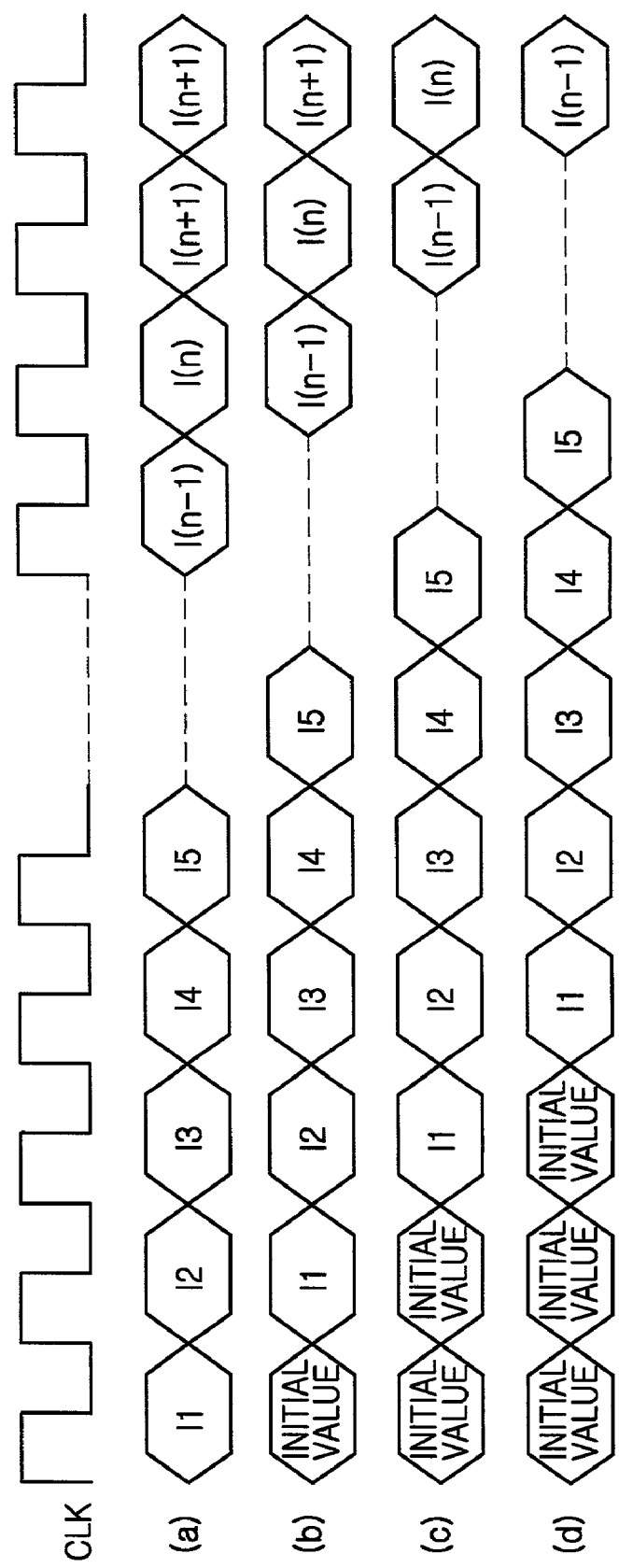
FIG. 6 is a timing diagram of the data shifter of FIG. 5.

FIG. 6 is a timing diagram of the data shifter of FIG. 5.

Referring to FIG. 6, when N bits of I channel data are inputted into the I channel, N bits of Q channel data are inputted into the Q channel. At this time, the N bits of I channel data have a cosine value and the N bits of Q channel data have a sine value.

When N bits of digital data are inputted into the data shifter 40, the N bits of digital data are shifted in synchronization with the clock CLK. Namely, whenever the data are passed one shift register, the data is delayed as much as one period of the clock CLK. For example, waveforms at (a), (b), (c) and (d) of FIG. 6 show these data shift operations.

The data delay in the data shifter 40 is controlled by the plurality of switches S1 to Sn+1 and the delay controller 41 controls each switch S1 to Sn+1. Namely, the delay controller 41 receives the C and D signals, the cosine function carrier $(\cos(\omega_c t))$ and the sine function carrier $(\sin(\omega_c t))$. The delay controller 41 detects a phase difference of the C and D signals and a phase difference of the cosine function carrier $(\cos(\omega_c t))$ and the sine function carrier $(\sin(\omega_c t))$. The detected phase difference of the C and D signals and the detected phase difference of the E and F signals are used to determine how the signals are mismatched on the basis of the phase difference of $\pi/2$. The phase mismatches are synthesized and then one switch corresponding to a delay suitable for compensating for the phase mismatches is turned on.

FIG. 7A is a timing diagram illustrating a phase mismatch compensation operation according to the present invention.

Referring to FIG. 7A, a first case shows that the phase difference of the I channel signal and the Q channel signal is accurately $\pi/2$. A second case shows that the phase difference of the Q channel signal and the I channel signal is lower than the phase difference of $\pi/2$ and a third case shows that the phase difference of the Q channel signal and the I channel signal is higher than the phase difference of $\pi/2$.

Figure 7B:
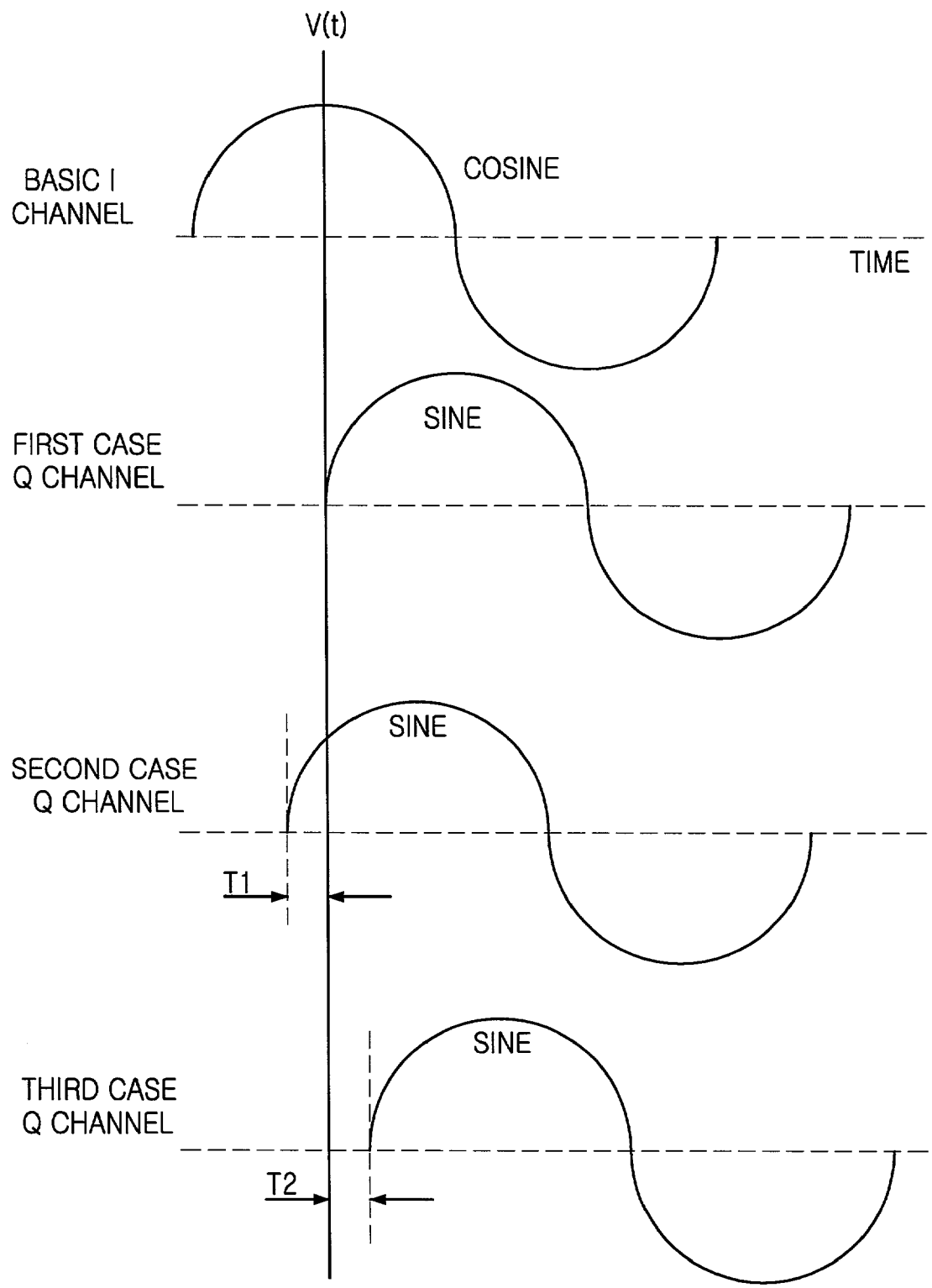
FIG. 7B is a graph illustrating a phase mismatch compensation operation according to the present invention.

FIG. 7B is a graph illustrating a phase mismatch compensation operation according to the present invention.

Referring to FIG. 7B, in the first case in FIG. 7A, since the I channel has a sine value and the phase difference of the I channel and the Q channel is accurately $\pi/2$, the Q channel has an accurate sine value so that the data shifters 40A and 40B do not have to be enabled.

In the second case, the phase difference of the Q channel and the I channel is lower than the phase difference of $\pi/2$, that is, the sine wave is early by as much as T1. Accordingly, the Q channel data shifter 40B is enabled and the switch S2 capable of delaying the N bits of Q channel digital data as much as clock periods corresponding to T1 (2 periods in FIG. 7A), is turned on so that the phase mismatch can be compensated.

In the third case, the phase difference of the Q channel and the I channel is higher than the phase difference of π/2, that is, the sine wave is late by as much as T2. Accordingly, the I channel data shifter 40A is enabled and the switch S2 capable of delaying the N bits of I channel digital data as much as clock periods corresponding to T2 (2 periods in FIG. 7A), is turned on so that the phase mismatch can be compensated.

In addition, since the data shifter employed in the present invention includes a relatively simple digital logic circuit, the data shifter can be easily implemented and accuracy of the processing result can be secured.

Accordingly, as the phase mismatch of the I/Q channels commonly generated in a system transmitting data with the PSK type is compensated, an accurate data transmission can be implemented.

While the present invention has been described with respect to the particular embodiments, it will be apparent to those skilled in the art that various changes and modifications may be made without departing from the spirit and scope of the invention as defined in the following claims.

What is claimed is:

1. A phase shift keying type modulator for performing data modulation, comprising:
    first and second digital-to-analog converting means for converting outputs of first and second data shifting means into analog signals respectively;
    first and second filtering means for filtering outputs of the first and second digital-to-analog converting means respectively;
    a mixing means for carrying outputs of the first and second filtering means with first and second carrier signals having a predetermined phase difference and generating one signal; and
    a delay control means for detecting phase mismatch between outputs of the first and second filtering means and phase mismatch between the first and second carrier signals and controlling delay of the first and second data shifting means to compensate the phase mismatch.

2. The modulator as recited in claim 1, wherein each of said first and second data shifting means includes:
    a plurality of shift registers, which are connected in series, operated in response to a clock signal; and
    a plurality of switches, which are connected to each input terminal of the plurality of shift registers, for selectively outputting outputs of the shift registers.

3. The modulator as recited in claim 2, wherein the first data shifting means and the first digital-to-analog converting means are controlled by a first clock.

4. The modulator as recited in claim 3, wherein the second data shifting means and the second digital-to-analog converting means are controlled by a second clock.

5. The modulator as recited in claim 1, wherein the mixer includes:
    an oscillator for generating the second carrier signal;
    a phase shifter for generating the first carrier signal by shifting the second carrier signal by a predetermined phase difference;
    a first multiplier for multiplying the output of the first filtering means by the second carrier signal;
    a second multiplier for multiplying the output of the second filtering means by the first carrier signal; and
    an adder for summing outputs of the first and second multipliers.

6. The modulator as recited in claim 5, wherein the phase shifter is a π/2 phase shifter.

7. The modulator as recited in claim 1, wherein the first and second filtering means are a low pass filter.

* * * * *